J. A. CAMERON AND G. B. BIRCH.
SLITTING AND REWINDING MACHINE.
APPLICATION FILED AUG. 7, 1918. RENEWED JULY 17, 1920.

1,354,464.

Patented Oct. 5, 1920.
6 SHEETS—SHEET 1.

Inventors
James A. Cameron
Gustaf B. Birch
By their Attorney

J. A. CAMERON AND G. B. BIRCH.
SLITTING AND REWINDING MACHINE.
APPLICATION FILED AUG. 7, 1918. RENEWED JULY 17, 1920.

1,354,464.

Patented Oct. 5, 1920.
6 SHEETS—SHEET 5.

UNITED STATES PATENT OFFICE.

JAMES A. CAMERON AND GUSTAF BIRGER BIRCH, OF BROOKLYN, NEW YORK, ASSIGNORS TO CAMERON MACHINE COMPANY, OF BROOKLYN, NEW YORK, A CORPORATION OF NEW YORK.

SLITTING AND REWINDING MACHINE.

1,354,464.     Specification of Letters Patent.     Patented Oct. 5, 1920.

Application filed August 7, 1918, Serial No. 248,718. Renewed July 17, 1920. Serial No. 397,151.

*To all whom it may concern:*

Be it known that we, JAMES A. CAMERON and GUSTAF B. BIRCH, citizens of the United States, and residents of the borough of Brooklyn, in the city of New York, county of Kings, and State of New York, have invented certain new and useful Improvements in Slitting and Rewinding Machines, of which the following is a specification.

The present invention relates generally to slitting and rewinding machines and has for its object means for insuring the separation of adjacent coils that have been rewound side by side.

The main feature of this invention resides in certain separating means that engage between rewound coils for the purpose of cutting unsevered threads that may still connect adjacent sections of rewound material.

In Patent No. 1,076,189 there is shown a slitting and rewinding machine in which are employed score cutting devices, for slitting the web into sections, and surface rewinding means including a rewinding shaft, two lower surface rewinding rollers and a top pressure rewinding roller, the latter being mounted in a carriage that is automatically displaced as the diameter of rewound coils increases. In Patent No. 1,258,644 substantially the same slitting and rewinding means are shown except that the top pressure roller is omitted, the rewinding shaft being mounted on the automatically displaced carriage and performing the function of a pressure roller. Due to the character of the slitting means,—that is, the score cutters,—the action of these cutters on the material is akin to a cleaving rather than a cutting, operation and it is, therefore, extremely difficult to sever all of the threads of certain fibrous materials, the result being that some threads remain uncut and connect the adjacent coils of rewound material, thereby rendering subsequent separation of such coils difficult. In Patent No. 1,076,189 separating means are disclosed that enter between adjacent sections of material while they are running in an unsupported layer and before being rewound. It has been found that the severing of such remaining threads may, in the case of certain materials, be more effectively accomplished by having the separating means engage between adjacent coils of the material while it is being rewound but when so located, a problem as to the accessibility and adjustability of the parts is presented since provision must be made for disengaging the separating means from the coils when it is desired to remove the latter from the machine. A further problem arises in respect to the proper alinement or registration of the separating means and the score cutting members since it is necessary for the cutting edges of both to be in the same plane and it has been found extremely difficult to obtain exact register of the score cutters and the separating means. It will be understood that this problem is a vital one because if rewinding of the material is not accomplished in a manner that will produce coils of uniform diameter, that is, so that one or more coils will not build up to a greater extent than others, the rewinding means will cause an unequal pull to be exerted on the web at the plane of severance which will distort the slitting action.

One of the features of this invention is the production of means whereby effective separating action may be obtained without the necessity of minutely exact registration of the score cutters and separating means. It has been found that by so mounting the separating means that limited pendulous or oscillating movement laterally is possible, the separating means will follow the cutting line of the score cutters and will therefore accommodate itself to any slight discrepancy in registration between the score cutters and the separating means and this without distortion or overlapping of the material of adjacent coils.

Other features of the invention reside in the fact that the separating means are mounted on the carriage that supports either the top pressure rewinding roller as in Patent No. 1,076,189, or the rewinding shaft as in Patent No. 1,258,644; and in means whereby the separating means will not only follow the movement of displacement of said carriage, due to increase in coil diameter, but may be adjusted and moved into and out of engagement with the coils independently of the movement of said carriage; and in the arrangement and location of these means so as to be accessible to admit of necessary adjustments being effected quickly and without interference with other parts.

Other features of the invention will appear as the specification proceeds.

In the accompanying drawings the invention is embodied in several concrete and preferred forms, in which.

1 indicates a web entering between a backing roller 2 and a score cutter 3 from which it passes to a rewinding shaft 4. The backing roller 2 forms one of a plurality of surface rewinding rollers all of which rotate in the same direction.

In the present instance, 5 is a second rewinding roller or back winding drum while 6 is a top pressure roller mounted on a carriage 7 which is displaceable with reference to the rewinding shaft in the manner described in Patent No. 1,076,189. The carriage 7 supports the separating means and it will be understood that, so far as certain features of the invention are concerned, it is immaterial whether or not such carriage 7 is connected to the top pressure roller 6, as in Patent No. 1,076,189, or whether or not it is connected to rewinding shaft 4, as in Patent No. 1,258,644. In the latter patent, the rewinding shaft constitutes a pressure roller as well as a rewinding shaft.

Figure 1:
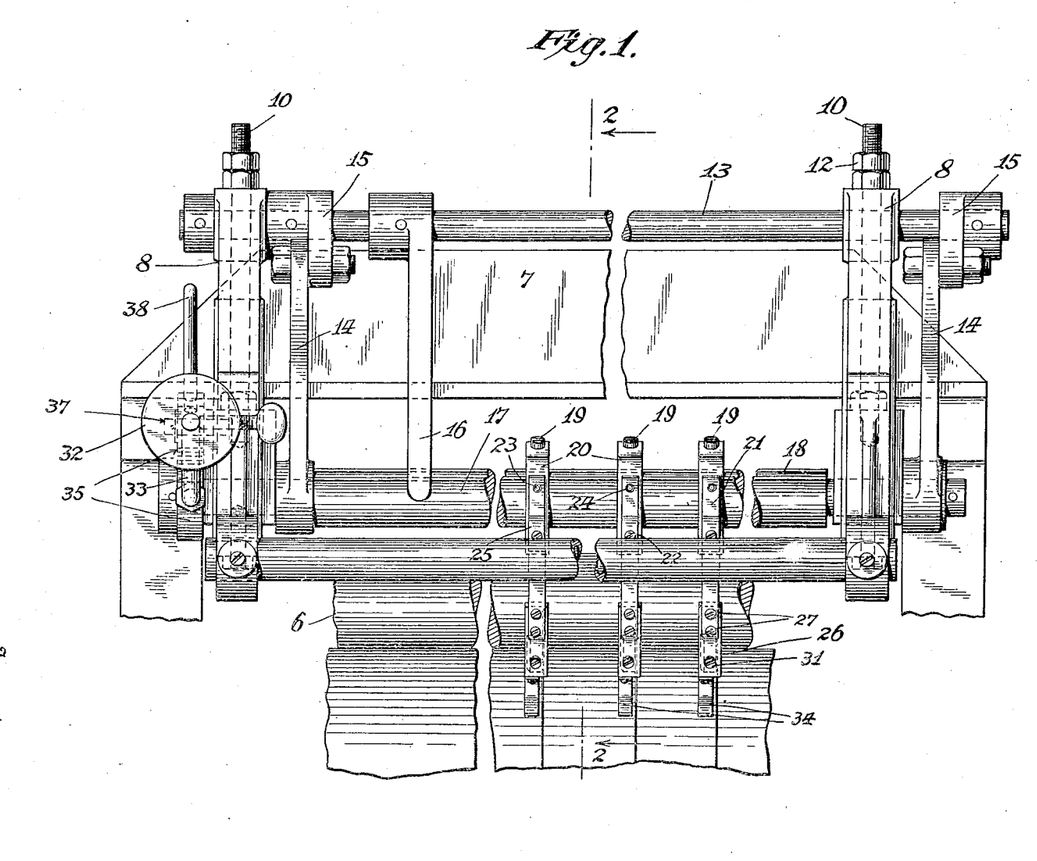
Figure 1 is a view looking in the direction of the arrow 1 of Fig. 2 of the separating means and adjacent elements when applied to a machine of the type shown in Patent No. 1,076,189.
Figures 2, 3:
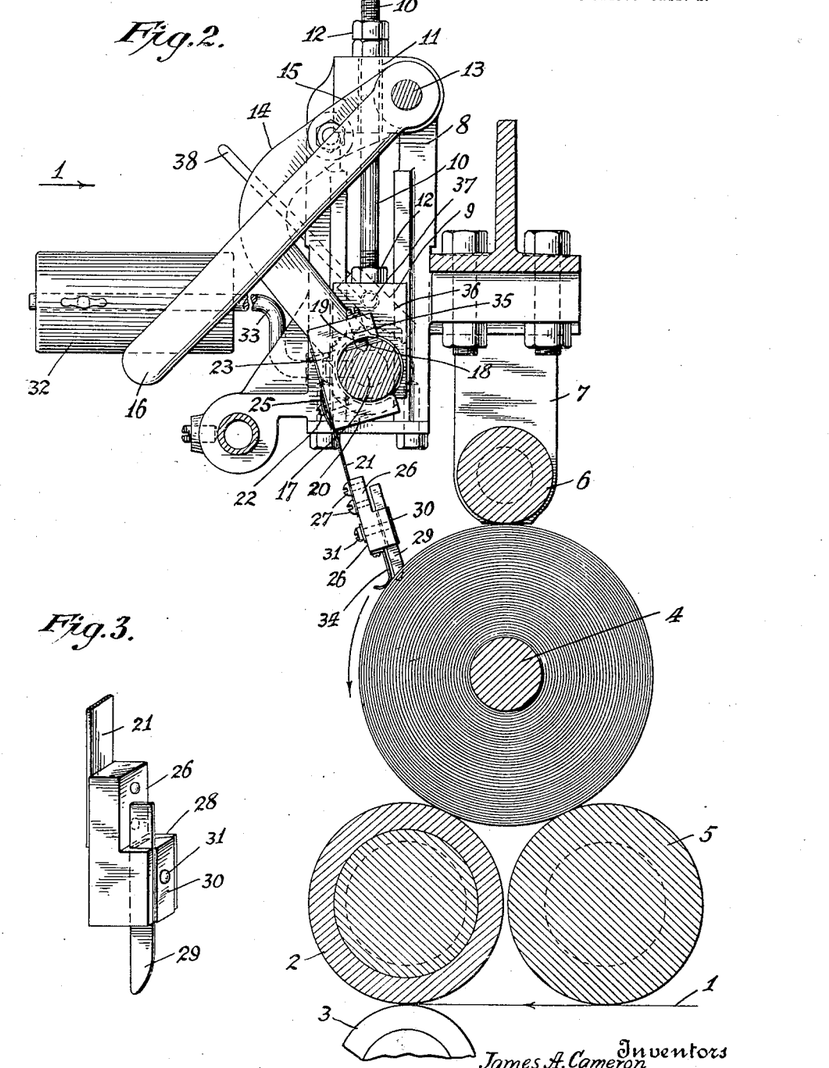
Fig. 2 is a vertical sectional view of the parts on the line 2—2 of Fig. 1.
Fig. 3 is a perspective view of the separating knife and its holder.
Figure 4:
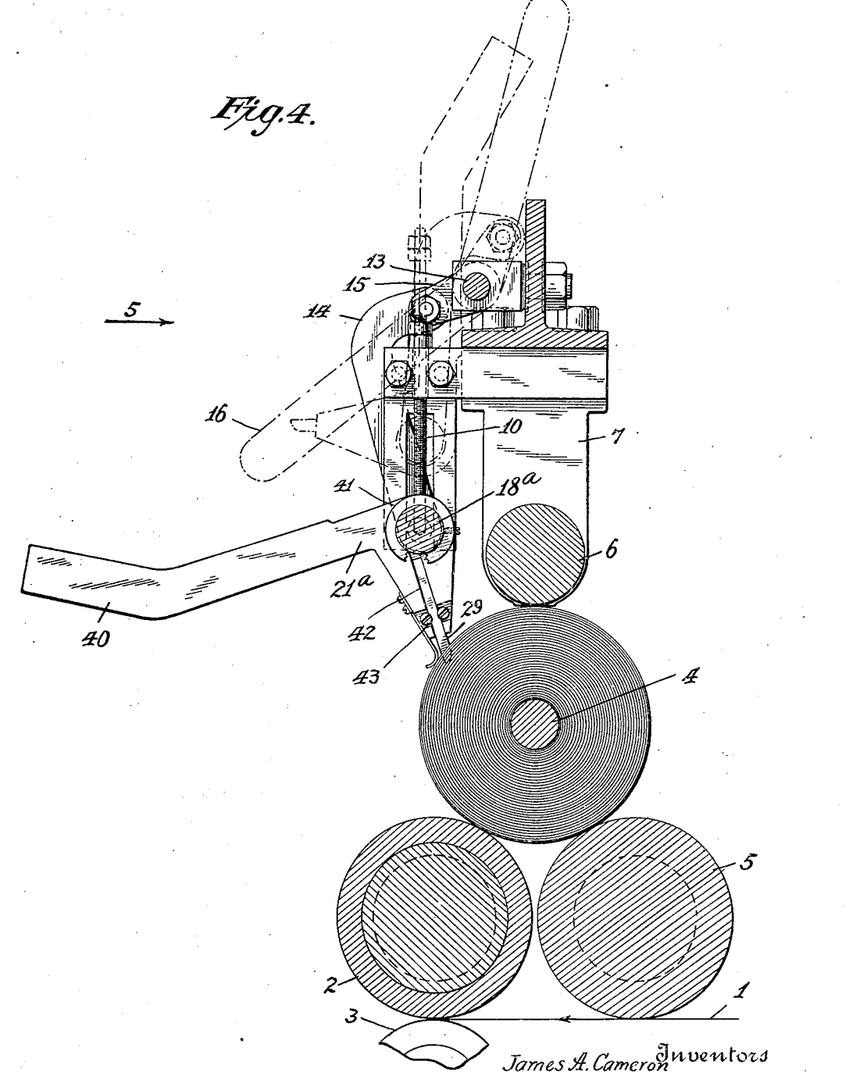
Fig. 4 is a vertical sectional view, on the line 4—4 of Fig. 5, showing a modified form of the invention.

8 indicates guides, one at each end of the machine, supported by carriage 7; and in these guides travel slides 9, said slides each having an upright rod 10 that passes freely through an aperture 11 at the upper end of guide 8 and which is provided with adjustable nuts 12 to limit the up-and-down movement of slides 9 in guides 8. Suitable means are provided for raising and lowering these slides, here consisting of a transverse shaft 13 between which and slides 9 are interposed toggle links 14 and 15, a handle 16 being mounted on shaft 13 to actuate the toggles. It will be seen that when handle 16 is swung into an upper position, such as is indicated in Fig. 4, the link 15 passes over the center of shaft 13 and maintains slides 9 in elevated position. Similarly, when the parts are in the position shown in Fig. 2, the toggle links are on, or have slightly passed over, "dead" center and therefore lock slide 9 in its lowermost position. Rotatably mounted in slide 9 is an oscillating support 17 having a groove 18 in which are seated screws 19 of blocks 20, said blocks being adjustable lengthwise of pivotal support 18 to bring the cutting member carried thereby into approximate registration with score cutter 3. 21 is a carrying member pivotally supported at 22 at a point intermediate its ends in such manner that it has, to a limited extent, a lateral pendulous or oscillating movement. The extent of oscillation is limited by pin 23 carried by block 20 and projecting through an opening 24 in the carrying member 21, said opening being slightly larger than pin 23. A spring 25, the tension of which may be adjusted by screws 22 that forms the pivotal support of carrying member 21 and on which said spring is mounted, produces sufficient tension to prevent carrying member 21 from swinging loosely back and forth laterally and to admit of its being moved sluggishly when the lower end thereof is acted upon in a manner to be described.

The carrying member 21 is, preferably, in the form of sheet material of resilient character and attached to its lower end, by means of screws 27, is a block 26 having a jaw 28. The inner face of one branch or arm of this jaw is tapered or wedge-shaped, as shown; and the other arm or branch is straight, also as shown. A knife 29 is inserted in the jaw 28 adjacent its inner straight edge and a filling member 30, having a wedge-shape portion, is inserted in the jaw and secured by means of a screw 31 so as to clamp the knife firmly. Suitable means, such as an adjustable weight 32, mounted on an arm 33 and connected to pivotal support 18, are employed for the purpose of causing knife 20 to be biased or to enter between adjacent rewound coils and thereby separate any unsevered threads remaining after the slitting operation between the coils. The inward movement or degree of penetration of said knife with respect to the coils may be limited by a stop member 34 that engages the surface of the rewound coils.

It will be understood that as the diameter of the rewound coils increases, carriage 7 will be automatically and correspondingly displaced, in a manner known, and will carry with it guides 8 and all members of the separating means so that the relation of the knife to the rewound material will be uniform irrespective of increase in the diameter of the coils. If it is desired to remove the rewound coils, carriage 7 may be elevated in the manner disclosed in the two patents referred to above; or, if it is desired to disengage the separating means from the rewound material without removing the latter from the machine, pivotal support 18 may be turned in its bearings in slides 9, as by grasping weight 32, thereby causing knife 29 to swing outwardly with respect to the rewound material. To prevent weight 32 from returning the parts when released, the end of member 18 carries a ratchet 35 into one of the notches of which is placed a detent 36 pivoted at 37 and actuated by means of handle 38. If desired, handle 16 may also be manipulated thereby raising slides 9 in guide 8 so as to elevate the parts entirely out of the way, thereby rendering free access to the rewound material possible.

It will be understood that it is difficult to obtain absolute registration between score cutter 3 and separating member 29. For this reason, the separating means are capable of a limited pendulous or oscillating motion so that the knife will readily adjust itself to the slit produced by the slitting means and without causing distortion of the fabric being rewound. Knife 29 therefore has two oscillating movements, one of which is due to pivotal support 18 and admits of oscillation in the plane of the cutting edge of the knife and the other to pivot 22 which admits of an oscillating or pendulous movement in a plane substantially at right angles to the cutting edge of knife 29. It will be understood that the oscillating movement derived from pivot support 18 will swing all the separating members or knives as a group, while the lateral oscillating movement will permit each separating member to adjust itself in response to differences in registration between the slitting and the separating means.

Figures 5, 6:
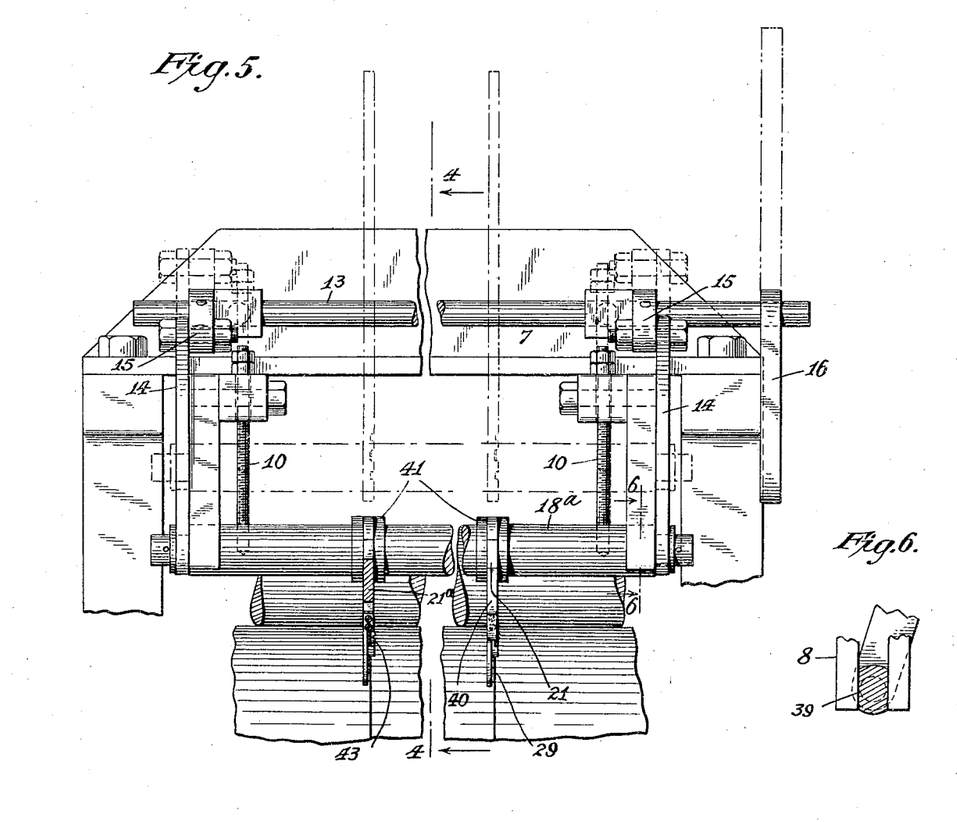
Fig. 5 is a view, looking in the direction of the arrow 5 in Fig. 4, partly in section.
Fig. 6 is a sectional view on the line 6—6 of Fig. 5.

In the modification shown in Figs. 4, 5 and 6, the construction is substantially the same with the exception that pivotal support 18$^a$, in this instance, has flattened ends 39 riding in the guides 8 so that no turning movement of member 18$^a$ is possible. In this instance, therefore, rods 10 are tapped directly into said member 18$^a$, as shown. The carrying members 21′ are, however, loosely mounted on pivotal support 18 and have each an extension 40 that constitutes a means for urging knife 29 into engagement with the coils of rewound material. In this instance, the lateral pendulous movement may be obtained by a loose fit between member 18$^a$ and carrying member 21$^a$, as will be understood; and spacing members, as 41, may be employed to prevent undue lateral displacement. The member 18$^a$ is, in this instance, moved in guide 8 by means of toggles 14 and 15, shaft 13 and handle 16 as in the form shown in Fig. 1. It will be understood, however, that when it is desired to gain access to the rewound material without lifting carriage 7 each carrying member 21$^a$ must be turned independently since they are loosely mounted on member 18$^a$ and the latter does not rotate. All of the carrying members 21$^a$, however, may be raised in a straight line, vertically, by actuating handle 16, as previously described. In this instance, knife 29 is seated in a slot 42 in carrying member 21$^a$ and set screws 43, overlying the edges of the knife, are used to secure it in position. In the form of the invention shown in Figs. 7 and 8, pivotal supporting member 18$^b$ has reduced end portions 44 that extend through bearings 45 into which latter rods 10 are tapped. The extreme ends of member 18$^b$ is still further reduced, as at 46, and pass freely through guides 8, collars 47 being provided to prevent endwise displacement. In this instance, therefore, member 18$^b$ may be turned by actuating handle 48. The member 18$^b$ is provided with a longitudinal slot 49 into which extends a spring 50 anchored on carrying member 21$^b$. The weight of the outer portion 51 of carrying member 21$^b$ tends by reason of the engagement of spring 50 with member 18$^b$, to turn the latter in its bearings 45 thereby urging knife 29 into engagement with the rewound material. The fit of member 21$^b$ on the support 18$^b$ is sufficiently loose to admit of lateral pendulous movement, spacing members 52 being provided to prevent undue displacement. In this instance, when handle 48 is manipulated, all the separating members will be withdrawn from the rewound material and may then be raised as a group by the manipulation of handle 16 and toggle members controlled thereby.

Figures 7, 9:
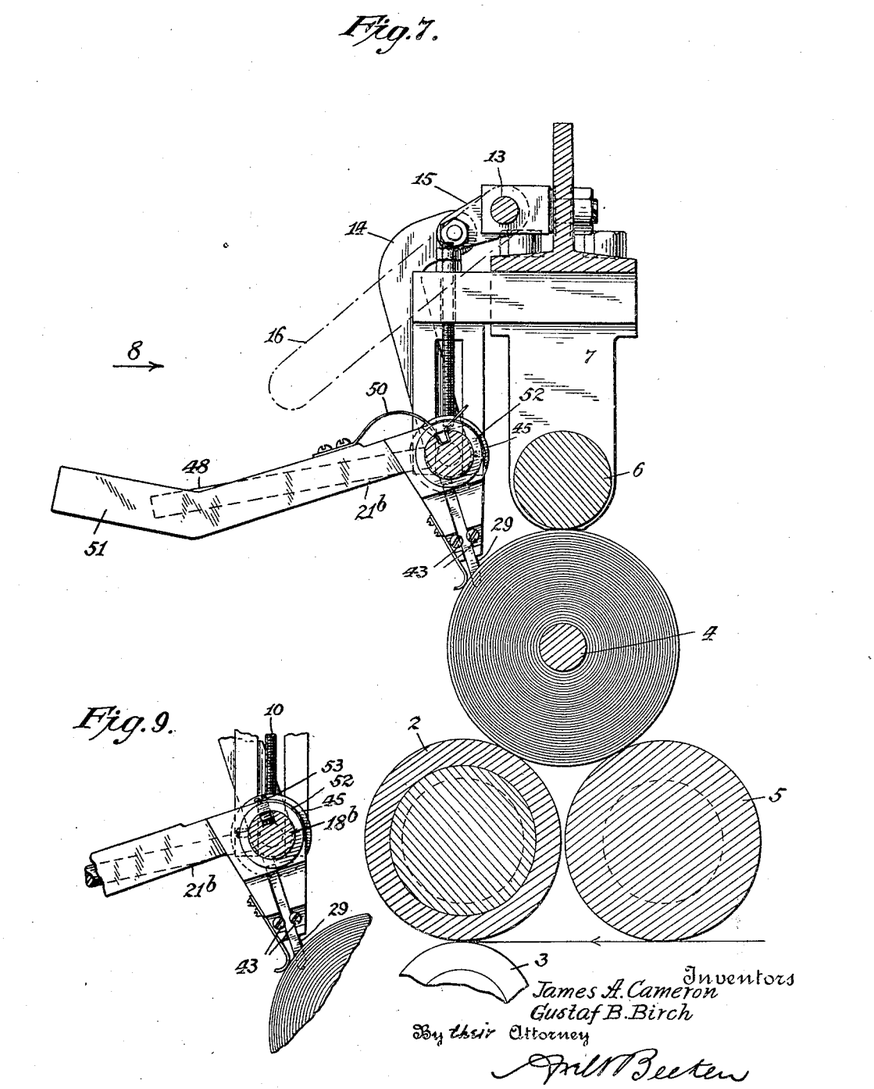
Fig. 7 is a vertical sectional view, on the line 7—7 of Fig. 8, of another modified form.
Fig. 9 is a view similar to a part of Fig. 7, showing a slight modification of the form of the invention shown in Fig. 7.
Figure 8:
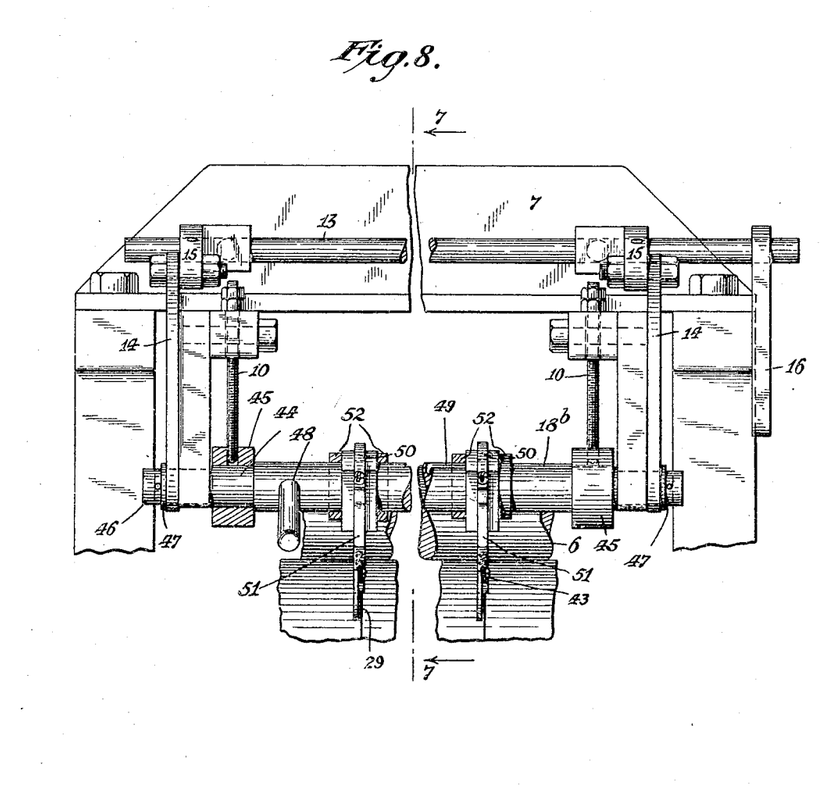
Fig. 8 is a view looking in the direction of the arrow 8 of Fig. 7 with parts broken away.

In the form shown in Fig. 9, the construction is substantially like that shown in Figs. 7 and 8 except that in place of springs 50 there are used screws 53 that pass through carrying member 21 having a loose fit in pivotal support 18$^b$.

We claim:

1. A slitting and rewinding machine comprising: means for slitting a web into sections, means for rewinding the slitted sections into side-by-side coils, and separating means capable of lateral pendulous movement engaging between adjacent rewound coils.

2. A slitting and rewinding machine comprising: means for slitting a web into sections, means for rewinding the slitted sections into side-by-side coils, and separating means, biased toward the rewound coils engaging between adjacent rewound coils and capable of lateral pendulous movement.

3. A slitting and rewinding machine comprising: means for slitting a web into sections, means for rewinding the slitted sections into side-by-side coils, a support automatically displaced by increase in diameter of the rewound coils, and separating means mounted on said support, engaging between adjacent rewound coils and capable of lateral pendulous movement.

4. A slitting and rewinding machine comprising: means for slitting a web into sections, means including two lower surface rewinding rolls and an upper pressure rewinding roll for rewinding the slitted sections into side-by-side coils, a support automatically displaced by increase in diameter of the rewound coils and carrying said pressure rewinding roller, and separating means, mounted on said support, engaging between adjacent rewound coils and capable of lateral pendulous movement.

5. A slitting and rewinding machine comprising: means for slitting a web into sections, means including two lower surface rewinding rolls and an upper pressure rewinding roller for rewinding the slitted sections into side-by-side coils, a main support automatically displaced by increase in diameter of the rewound coils and carrying said pressure rewinding roller, separating means engaging between adjacent rewound coils and means for disengaging the separating means from the coils independently of the movement of the main support including a pivotal support mounted on the main support and carrying the separating means, means normally urging the separating means into engagement between adjacent rewound coils, and means for retaining the pivotal support in position with the separating means out of engagement with the coils.

6. A slitting and rewinding machine comprising: means for slitting a web into sections, means including two lower surface rewinding rolls and an upper pressure rewinding roller for rewinding the slitted sections into side-by-side coils, a main support automatically displaced by increase in diameter of the rewound coils and carrying said pressure rewinding roller, separating means engaging between adjacent rewound coils and means for disengaging the separating means from the coils independently of the movement of the main support including a pivotal support mounted on the main support and carrying the separating means, means normally urging the separating means into engagement between the adjacent rewound coils, and sliding means carrying the pivotal support.

7. A slitting and rewinding machine comprising: means for slitting a web into sections, means including two lower surface rewinding rolls and an upper pressure rewinding roller for rewinding the slitted sections into side-by-side coils, a main support automatically displaced by increase in diameter of the rewound coils and carrying said pressure rewinding roller, separating means engaging between adjacent rewound coils and means for disengaging the separating means from the coils independently of the movement of the main support including a pivotal support mounted on the main support and carrying the separating means, means normally urging the separating means into engagement between adjacent rewound coils, sliding means carrying the pivotal support, and toggles for raising and lowering the sliding means and for maintaining said sliding means in elevated position.

8. A slitting and rewinding machine comprising: means for slitting a web in sections, means including two lower surface rewinding rolls and an upper pressure rewinding roller for rewinding the slitted sections into side-by-side coils, a support automatically displaced by increase in diameter of the rewound coils and carrying said pressure rewinding roller, separating means engaging between adjacent rewound coils and mounted to follow the automatic displacement of said support, means including a pivotal support for the separating means and a sliding member carrying said pivotal support for adjusting said separating means with respect to the rewound coils independently of the movement of the first mentioned support and toggles for actuating and locking said sliding member in position.

9. A slitting and rewinding machine comprising: means for slitting a web into sections, means including two lower surface rewinding rolls and an upper pressure rewinding roller for rewinding the slitted sections into side-by-side coils, a support automatically displaced by increase in diameter of the rewound coils and carrying said pressure rewinding roller, separating means engaging between adjacent rewound coils and mounted to follow the automatic displacement of said support, means including a pivotal support for the separating means and a sliding member carrying the pivotal support for adjusting said separating means with respect to the rewound coils independently of the movement of the first mentioned support, and means for urging the separating means into engagement with the rewound coils.

10. A slitting and rewinding machine comprising: means for slitting a web into sections, means including two lower surface rewinding rolls and an upper pressure rewinding roller for rewinding the slitted sections into side-by-side coils, a support automatically displaced by increase in diameter of the rewound coils and carrying said pressure rewinding roller, separating means engaging between adjacent rewound coils and mounted to follow the automatic displacement of said support, means including a pivotal support for the separating means and a sliding member carrying the pivotal support for adjusting said separating means with respect to the rewound coils independently of the movement of the first mentioned support, means for urging the separating means into engagement with the rewound coils, and means for engaging with the surface of the rewound coils for limiting the degree of penetration of the separating means between adjacent coils.

11. In a machine of the character set forth, separating means comprising: a knife, a carrying member mounted to oscillate in a plane substantially at right angles to the cutting edge of the knife, a pivotal support for said carrying member admitting of oscillation of the knife in the plane of its cutting edge, means associated with said carrying member for normally urging it in one direction in the plane of the cutting edge of the knife, and a sliding member carrying said pivotal support.

12. In a machine of the character set forth, separating means comprising: a knife, a carrying member mounted to oscillate in a plane substantially at right angles to the cutting edge of the knife, a pivotal support for said carrying member admitting of oscillation of the knife in the plane of its cutting edge, means associated with said carrying member for normally urging it in one direction in the plane of the cutting edge of the knife, a sliding member carrying said pivotal support, and toggles for actuating said sliding member.

13. A slitting and rewinding machine comprising: means for slitting a web into sections, means for rewinding the slitted sections into side-by-side coils, a main support automatically displaced by increase in diameter of the rewound coils, separating means engaging between adjacent rewound coils, and means for disengaging the separating means from the coils independently of the movement of the main support including a pivotal support mounted on the main support and carrying the separating means, means normally urging the separating means into engagement between adjacent rewound coils, and means for retaining the pivotal support in position with the separating means out of engagement with the coils.

14. A slitting and rewinding machine comprising: means for slitting a web into sections, means for rewinding the slitted sections into side-by-side coils, a main support automatically displaced by increase in diameter of the rewound coils, separating means engaging between adjacent rewound coils, and means for disengaging the separating means from the coils independently of the movement of the main support including a pivotal support mounted on the main support and carrying the separating means, means normally urging the separating means into engagement between adjacent rewound coils, and sliding means carrying the pivotal support.

15. A slitting and rewinding machine comprising: means for slitting a web into sections, means for rewinding the slitted sections into side-by-side coils, a main support automatically displaced by increase in diameter of the rewound coils, separating means engaging between adjacent rewound coils, and means for disengaging the separating means from the coils independently of the movement of the main support including a pivotal support mounted on the main support and carrying the separating means, means normally urging the separating means into engagement between adjacent rewound coils, sliding means carrying the pivotal support, and toggles for raising and lowering the sliding means and for maintaining said sliding means in elevated position.

16. A slitting and rewinding machine comprising: means for slitting a web into sections, means for rewinding the slitted sections into side-by-side coils, a support automatically displaced by increase in diameter of the rewound coils, separating means engaging between adjacent rewound coils and mounted to follow the automatic displacement of said support, and means for adjusting said separating means with respect to the rewound coils independently of the movement of said support.

17. A slitting and rewinding machine comprising: means for slitting a web into sections, means for rewinding the slitted sections into side-by-side coils, a support automatically displaced by increase in diameter of the rewound coils, separating means engaging between adjacent rewound coils and mounted to follow the automatic displacement of said support, means for adjusting said separating means with respect to the rewound coils independently of the movement of said support including a pivotal support for the separating means and a sliding member carrying said pivotal support.

18. A slitting and rewinding machine comprising: means for slitting a web into sections, means for rewinding the slitted sections into side-by-side coils, a support automatically displaced by increase in diameter of the rewound coils, separating means engaging between adjacent rewound coils and mounted to follow the automatic displacement of said support, means for adjusting said separating means with respect to the rewound coils independently of the movement of said support including a pivotal support for the separating means and a sliding member carrying said pivotal support, and toggles for actuating and locking said sliding member in position.

19. A slitting and rewinding machine comprising: means for slitting a web into sections, means for rewinding the slitted sections into side-by-side coils, a support automatically displaced by increase in diameter of the rewound coils, separating means engaging between adjacent rewound coils and mounted to follow the automatic displacement of said support, means for adjusting said separating means with respect to the rewound coils independently of the movement of said support including a pivotal support for the separating means and a sliding member carrying said pivotal support, and means for urging the separating means into engagement with the rewound coils.

20. A slitting and rewinding machine comprising: means for slitting a web into sections, means for rewinding the slitted sections into side-by-side coils, a support automatically displaced by increase in diameter of the rewound coils, separating means engaging between adjacent rewound coils and mounted to follow the automatic displacement of said support, means for adjusting said separating means with respect to the rewound coils independently of the movement of said support including a pivotal support for the separating means and a sliding member carrying said pivotal support, means for urging the separating means into engagement with the rewound coils, and means for engaging with the surface of the rewound coils for limiting the degree of penetration of the separating means between adjacent coils.

Signed at the borough of Brooklyn, in the county of Kings, city and State of New York, this 2 day of August 1918.

JAMES A. CAMERON.
GUSTAF BIRGER BIRCH.